June 8, 1948.  O. E. WOLFF  2,443,154
DEVELOPING CAMERA
Filed April 26, 1947  2 Sheets-Sheet 1

FIG. 1

INVENTOR
Otto E. Wolff
BY
Donald L. Brown
Attorney

June 8, 1948.                O. E. WOLFF                2,443,154
                         DEVELOPING CAMERA
            Filed April 26, 1947           2 Sheets-Sheet 2

INVENTOR
Otto E. Wolff
BY
Donald L. Brown
Attorney

Patented June 8, 1948

2,443,154

UNITED STATES PATENT OFFICE 2,443,154

DEVELOPING CAMERA

Otto E. Wolff, Cambridge, Mass., assignor to Polaroid Corporation, Cambridge, Mass., a corporation of Delaware Application April 26, 1947, Serial No. 744,199

20 Claims. (Cl. 95—13)

1

This invention relates to camera apparatus and more particularly to a hand-held camera incorporating novel mechanical constructions for jointly subjecting photographically exposed film material and other materials to predetermined applications of stress for processing the film.

An object of the invention is to provide a camera having a sectional casing, one section thereof being slidably mounted upon another whereby either section may be manually moved in a plane parallel to the plane in which the other is held stationary for processing photographic materials positioned on a surface of one of the sections.

Another object of the invention is to provide a camera incorporating constructions of the aforesaid type, the respective sections thereof being provided with means cooperating with one another for insuring said parallel movement and having associated therewith means for controlling the speed at which one section thereof may be moved relative to the other.

A further object of the invention is to provide a camera having constructions of the aforesaid type wherein elements associated with that section which is manually moved may be caused to undergo operational contact with elements of the other section.

Still another object of the invention is to provide a camera having casing constructions of the aforesaid type wherein elements associated with one of the respective sections may be caused to move progressively in operational contact with photographic materials carried by the other section in a plane at least coextensive with the focal plane of the camera.

A still further object of the invention is to provide a camera having sectional casing constructions of the aforesaid relatively movable type, one section thereof carrying a film material and the other carrying an opaque sheet material having an area adapted to carry a positive image when superimposed and compressed with an exposed area of the film, movement of either of the respective sections bringing into operation elements for accomplishing said contact and compression of the materials.

Yet another object of the invention is to provide a camera having instructions of the aforesaid type, one of the casing sections carrying pressure applying means adapted to progressively pass over an area of the aforesaid photographic materials, at least coextensive with an exposed image area thereof, whereby a fluid, interposed between the materials or releasably incorporated

2 with one of the materials adjacent an extremity thereof, may be released and spread between the materials at least throughout said image area.

Another object of the invention is to provide a camera having the aforesaid constructions and comprising means for moving the pressure applying means in a given plane and in a given direction enabling progressive contact thereof with the photographic materials, for moving the pressure applying means out of the plane of contact with the photographic materials to a second plane upon completion of the aforesaid fluid spreading movement thereof, for moving the pressure applying means reversely of said first-named movement in said second-named plane, and for returning the pressure applying means from said second-named plane to said first-named plane.

A further object of the invention is to provide means adapted to effect spreading of a processing fluid between the film and sheet material in the form of a layer of predetermined and substantially constant thickness.

Still another object of the invention is to provide means for access to materials carrying the completed positive print and for removal of said materials from the camera.

Other objects of the invention are to provide a camera having the aforesaid constructions and incorporating suitable exposure, film-advancing, film-positioning, and light-shielding means, and means providing ready access to the interior of respective casing sections for mounting, threading, and removing the photographic materials.

Further objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Camera apparatus of the invention is adapted to perform a plurality of operations upon photographic materials comprising a photosensitive film material and another, preferably opaque sheet-like material between which a processing fluid is interposed, said operations being particularly adapted to carry on a process whereby there is provided a positive photographic print in or upon one of the materials. The fluid may preferably be releasably confined in a container incorporated with one of the sheet-like materials. Aforesaid operations of the apparatus comprise photographic exposure of the film, advancement and positioning of the materials, and progressive applications of compression to said materials providing release and spreading of the fluid between an exposed area of film and a similarly dimensioned area of the other material. Said operations when performed relative to materials of the aforesaid type are adapted to provide a positive print of the subject image of an exposure.

Figure 1:
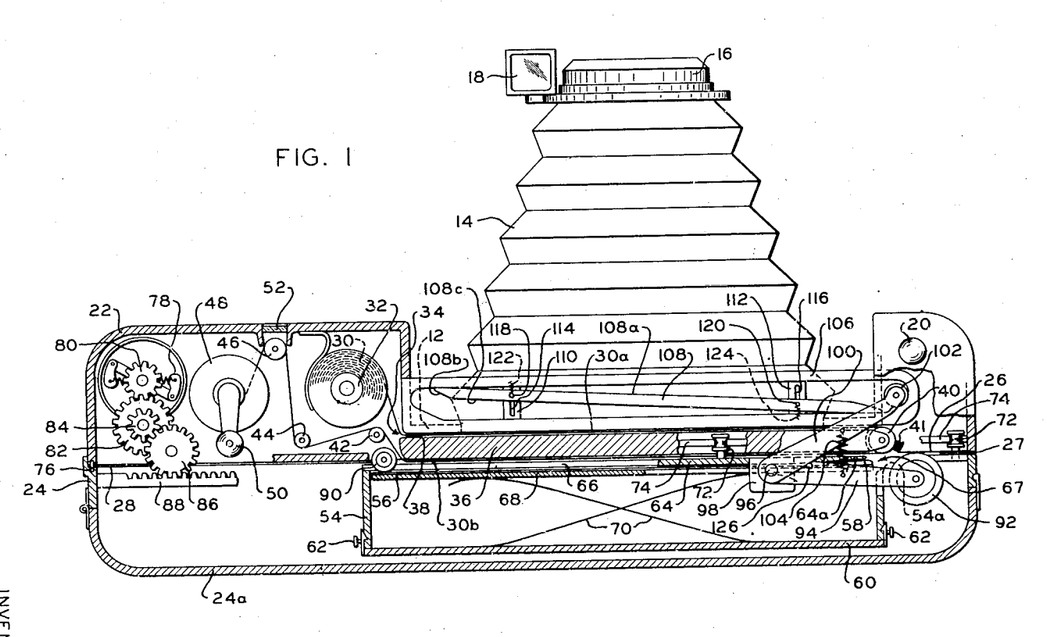
Figure 1 is a somewhat schematic view, partly in cross section and with parts broken away, of one form of the novel camera apparatus of the invention.
Figure 2:
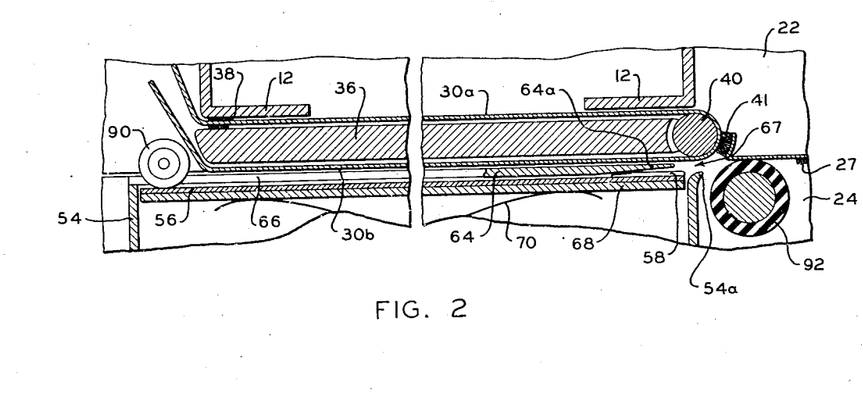
Fig. 2 is a view in detail of components of Fig. 1 showing a fragmentary portion of the the magazine and adjacent elements.
Figure 3:
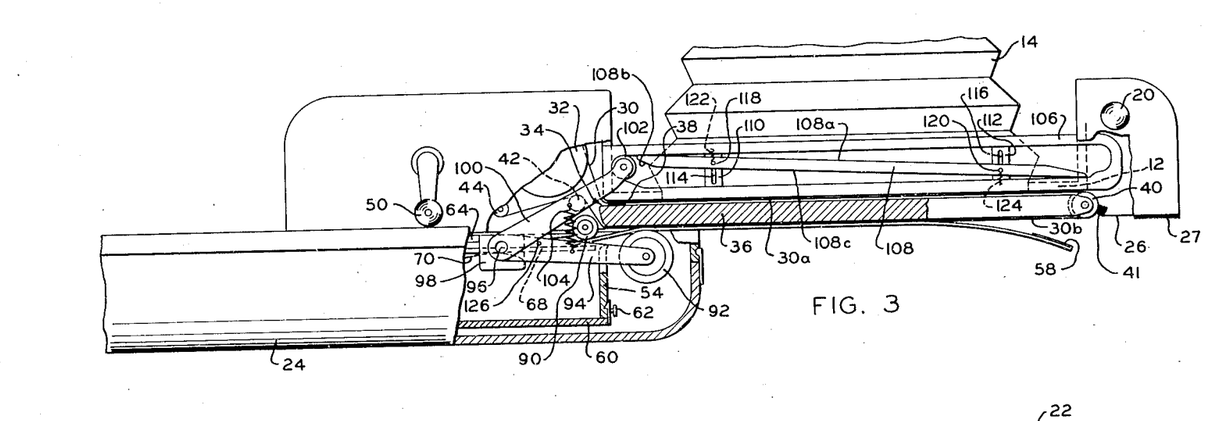
Fig. 3 is a sectional view showing the camera after completion of slidable movement of one of the sections thereof in a given direction whereby processing means have functionally passed across the photographic materials and the camera elements are so positioned as to permit removal of the material carrying the positive print from the camera.

Referring to Fig. 1, a sectional view of a hand-held photographic camera is shown, the camera comprising both conventional camera elements such as framing plate 12, bellows 14, lens 16, view finder 18 and shutter release 20 and other elements comprising novel constructions of the invention presently to be described. The camera casing is of a sectional type comprising sections 22 and 24, either of said sections being slidably movable relative to the other, it being assumed for clarity of description that section 24 is manually movable in a plane perpendicular to the optical axis and parallel to the plane in which section 22 is held stationary. As shown, side portions and one end of casing section 24 slightly overlap section 22 to provide a light seal. Facing surfaces 26 and 28 of said sections 22 and 24, respectively, or any extended portions of said surfaces are suitably spaced whereby area 30b of the film material which is shown as held in contact with a surface of section 22, is out of contact with a surface of section 24. Surface 26 is provided with a light-shielding strip 27. Manually effected movement of casing portion 24 to open position is shown in Fig. 3.

Again considering Fig. 1, film 30 is supplied from suitable film holding means, such as spool 32 rotatably mounted within casing section 22, released film being led through an aperture 34 formed by framing plate 12 and plate 36 mounted within said section 22, said aperture having suitable light-shielding strips 38 as, for example, strips of a piled fabric, associated therewith. The film, comprising portions 30a and 30b, is passed across the focal plane, in contact with the front surface of plate 36 and surfaces of framing plate 12, around guide means 40, rotatably mounted at an extremity of plate 36 and having light-shielding strip 41 adjacent thereto, across the rear surface of plate 36, over suitable guide rollers 42, 44 and 46 around take-up spool 48. The take-up spool is manually rotatable by means of handcrank 50, attached thereto, it being understood that said take-up spool preferably incorporates unidirectional means such as an overrunning clutch for holding the film substantially taut. Assuming the film to be released from spool 32 with the photosensitive surface thereof uppermost, it follows that said surface faces exposure means of the camera, when positioned in the focal plane, and faces elements of casing section 24, when positioned across the rear surface of plate 36, said film subsequently being wound upon take-up spool 48. A viewing window 52, comprising appropriate light-filtering transparent material, enables the viewing of indicia carried by the film, said indicia when positioned adjacent said window indicating an exposable length of film positioned across the frontal surface of plate 36 and an exposed length of said film positioned across the rear surface of said plate.

A magazine 54 adapted to releasably hold a plurality of sheets 56 of a material to be utilized in forming positive prints is mounted within casing section 24, said sheets, for example, being in the form of card-like materials of suitable thickness and composition for resisting deformation during release from the magazine, and having suitable surfaces for receiving a positive photographic image. Each of said sheets, in the form shown, has a fluid container 58 mounted adjacent its extremity, said container releasably confining a photographic processing fluid, it being noted that sheets 56 are so loaded in, and released from, the magazine that each container 58 will lie between the sheet upon which it is mounted and the photosensitive surface of film portion 30b when the sheets and film are brought to adjacent relationship. Magazine 54 comprises a releasable cover plate 60 having suitable latch means 62, a frontal wall 64 bisected by a slot 66 extending substantially its entire length, said frontal wall preferably having a tapered portion 64a and said portion, together with extremity 54a of the magazine side wall, forming an aperture 67 through which sheet material 56 may be released from the magazine. The sheet material is biased toward frontal wall 64 by pressure plate 68 and spring 70. Casing section 24 comprises pivotally connected portion 24a enabling access to the interior of said section, it being understood that suitably detachable cover plates, not shown, are also provided for enclosing the apparatus.

The respective sections are slidably mounted and held in proper alignment during movement of said section 24 by any suitable slidable engaging means such as a plurality of grooved rollers 72 adapted to ride upon tracks 74, it being understood that said means are positioned at opposite sides of the casing. Detent means 76 is provided for releasably holding the casing sections at closed position. Speed governor 78, comprising gear 80 and actuated by engaging gears 82, 84, and 86, all of which are mounted in casing section 22, is operationally rotated by engagement of said gear 86 with a rack 88 fixedly mounted upon section 24. Slidable movement of section 24 thus provides rotation of the governor and enables control of the speed of said movement. Governor 78 preferably incorporates suitable clutch means providing rotation thereof when gear 80 is actuated in one direction only as, for example, in a clockwise direction as shown in Fig. 1.

Means for releasing each sheet of material 56 from magazine 54 comprises element 90 in the form of a roller mounted upon section 22, said roller having yieldable frictional surfacing and unidirectional means such as an overrunning clutch. Roller 90 is mounted at a transverse midpoint of section 22 and extends radially through slot 66 of frontal plate 64 of the magazine, said slot 66 preferably being of sufficient width to insure absence of contact of said roller therewith. The periphery of roller 90 bears upon the surface of sheet material and is provided with a substantial degree of frictional contact therewith through appropriate frictional character of its surfacing in combination with bias imparted to the sheet in a direction toward said roller by pressure plate 68 and spring 70, said friction between roller and sheet exceeding that existing between sheets in the magazine. It will be noted that when the casing sections are closed, as shown in Fig. 1, roller 90 is so mounted relative to magazine 54 as to contact sheet material 56 adjacent an extremity thereof. When section 24 is slidably moved to open position, roller 90 is locked against rotation by the aforesaid overrunning clutch incorporated therewith and frictional contact of said roller with sheet 56 is maintained, said sheet being stripped from remaining sheets and released from the magazine through aperture 67.

Means for applying compression to fluid carrying sheet 56 and exposed film portion 30b comprises pressure roller 92, rotatably mounted at each end thereof upon an arm 94, each of said arms being rotatably mounted by an individual pivot 96 upon a suitable portion of section 24, as, for example, upon one of a pair of brackets 98 attached to magazine 54. A lever-like arm 100 is also pivotally mounted upon each pivot 96, each of said arms 100 carrying a roller bearing 102 rotatably mounted at its extremity. Arms 94 and 100 are interconnected at each side of section 22 by an extension spring 104, said spring biasing pressure applying roller 92 against surface 26 of section 22 as shown in Fig. 1 and being adapted to bias said roller 92 against the rear surface of plate 36 when moved adjacent thereto. Individual track means 106 mounted upon each side of section 22 and comprising a floating rail 108 is provided for guiding roller bearings 102 during aforesaid planar movement of section 24. Each floating rail 108 is mounted for transverse movement relative to track 106, mounting means therefor comprising brackets 110 and 112 having slots 114 and 116, respectively, adapted to slidably receive pins 118 and 120 of the floating rail, said pins being biased in opposite transverse directions by springs 122 and 124, respectively. Said constructions provide that when roller bearing 102 is moved in a direction toward the left (Fig. 1), said roller bearing bears upon surface 108a of the floating rail forcing said surface away from track 106 against bias of spring 122. After roller bearing 102 has passed the extremity of the floating rail, as shown in Fig. 3, at which point pressure roller 92 has completed its functional movement across the sheet material, said rail returns to the position shown in Fig. 1 through bias applied thereto by spring 122, roller bearing 102 then being urged in a direction toward the focal plane by extension spring 104 and being adapted to undergo return movement to its initial position in a second plane. Angular surface 108b of the floating rail serves to guide the roller bearing to surface 108c of said floating rail and said surface 108c provides guide means for return movement of the roller gearing in a second plane parallel to the plane of initial travel.

Roller bearing 102 is enabled to move to said second plane of travel by reason of pivotal mounting of lever-like arm 100, rotation of said arm 100 to the degree necessary for movement of the roller bearing in said second plane, as provided by travel of the roller bearing along surface 108b, bringing arm 100 in rotational contact with pin 126, mounted on arm 94, and thereby causing said arm 94 to rotate to a small degree in a similar direction about pivot 96. Accordingly, pressure roller 92 is removed from contact with sheet material 56 and remains out of contact with said material during return travel of roller bearing 102 in said second plane. During return movement of the casing section, carrying therewith said pressure applying roller 92 and mounting means therefor, unidirectional roller 90 rotates freely in response to frictional contact with the uppermost sheet of material in the magazine and plays no functional role. Upon approaching its limit of return travel, the relative operation of roller bearing 102 and floating rail 108 is similar to that above described at the limit of initial travel, both the roller bearing and pressure roller returning to the position shown in Fig. 1, said pressure roller again becoming subject to bias imparted by extension spring 104.

In résumé, operation of the aforesaid elements comprises the following procedure. Assuming casing sections to be at the position shown in Fig. 1, a leader of film is threaded through the apparatus from supply spool 32 to take-up spool 48. The film is advanced by handcrank 50 until the first exposable area thereof, with the photosensitive emulsion facing lens 16, is positioned across framing plate 12, as indicated by positioning of indicia at viewing aperture 52. The film is photographically exposed, the exposed portion thereof is advanced by said handcrank to a position adjacent the rear surface of plate 36 against which said film portion, with said photosensitive emulsion outermost, may be compressed with sheet material 56 during processing operations. Concurrently, an unexposed portion of film is positioned across framing plate 12, said positions of exposable and exposed film portions being indicated by the position of indicia carried by the film at viewing means 52. Assuming casing section 22 to be held stationary, casing section 24 is then moved as hereinbefore described, rollers 72 riding upon track 74 and providing bearing means for said movement, and the speed of said movement being limited by speed governor 78, deriving rotational movement from engagement of gear 86 with rack 88. Friction roller 90, being locked against rotation, adapted to longitudinal movement along slot 66, and in frictional contact with sheet material 56 which carries fluid container 58, maintains said sheet material stationary with respect to the area of film 30b positioned on the rear surface of plate 36, aperture 67 enabling release of the sheet material from magazine 54 while the latter is withdrawn from the sheet material through slidable movement of casing section 24. Substantially concurrently, pressure roller 92 is brought in contact with sheet material 56, progressively applies compression to said sheet material and area of film 30b having container 58 therebetween, hydraulically releases the processing fluid from the container in the direction of movement of said roller, and spreads said fluid in the form of a layer of substantially constant thickness between a surface of said material 56 and said surface area 30b of the film. It will be understood that the surface of plate 36 against which the film is placed provides a nonyielding area contributing to said application of compression and that extension spring 104 applying predetermined bias to roller 92, and governor 78, limiting the speed of rotation of said pressure roller, constitute, respectively, means for controlling the magnitude of compressive force and the period of applied compression, said means, in combination, contributing to the ultimate form of said layer of processing fluid. Upon completion of said fluid spreading procedure, the respective casing sections, elements of the apparatus mounted therein, and compressed sheet and film materials are positioned as shown in Fig. 3. After maintenance of said film and sheet material in compressed relationship for a suitable period of time for completing formation of the positive image, sheet material 56, bearing said image, may be manually stripped from film portion 30b in the manner shown in Fig. 3.

After removal of the positive print, casing section 24 is returned to closed position, pressure roller element 92 of said section being carried along a plane out of contact with developed film 30b, mounting means for said element 92 engaging guide means defining said plane of travel. Upon the closing of said casing sections, the camera apparatus is in readiness for a second photographic exposure of the film, after which the film is advanced, as above described, developed portions utilized in forming each positive print being wound upon take-up spool 48.

It will be obvious that modification of certain of the elements may be made within the scope of the invention. Roller bearing 102 in conjunction with track 106 comprising floating rail 108 provides means well adapted to the aforesaid movements of pressure roller 92 in two planes but could be supplanted by other forms of guide means for the purpose. Pressure roller 92 could appropriately comprise a surfacing of resilient material the resiliency thereof being predetermined with respect to the bias applied by extension spring 104, the characteristics of speed governor 78 and the viscosity of the processing fluid. A nonrotatable form of pressure applying means as, for example, a blade-like element, could also be employed. Another form of pressure applying member adapted to be held predeterminedly spaced from the rear planar surface of plate 36 could likewise be utilized. Friction roller 90, while represented as a unidirectional friction roller could be supplanted by other means such as a pivotally mounted arm having a frictional sheet contacting extremity, said arm being biased in such a manner as to be functional during movement of the sheet material in but one direction. Bearing means 72, while shown as a roller, could be in the form of a shoe. Elements schematically indicated and relating to photographic exposure of the film such as the lens, bellows and view finder could be of any appropriate design and are not limited to the forms shown, said elements forming no part of the claims.

The speed governor may be omitted in a further modification of the apparatus. Another embodiment in conjunction with suitable severance means contemplates the use of a roll of sheet material in place of separate sheets as shown. Although the entire sheet material is shown as lifted from the film, after compression of the materials, it will be understood that a shorter sheet than that shown may be employed and a perforated portion, only, comprising the image area may thus be removed. Wherein the aforesaid type of sheet material is employed, the take-up spool may be enlarged to accommodate both the film and portions of sheet material adhering thereto. The take-up spool also provides means for receiving and holding any of the processing fluid which may remain on the materials in excess of that retained within the image area per se.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. Apparatus for subjecting a photographically exposed area of a light-sensitive film material to a predetermined processing comprising, in combination, film-supporting means comprising a surface adapted to support at least said exposed area of film, means for releasably mounting a sheet material adapted to be positioned in adjacent superposed relation with said supported area of film, said materials when in said adjacent relation being adapted to have a fluid container releasably carrying a predetermined quantity of processing fluid positioned between portions thereof, means slidably interconnecting said film-supporting means and said sheet material mounting means enabling relative movement of said means, means fixed with respect to said film-supporting surface and operative during relative movement of said film-supporting surface and said sheet material mounting means for holding said sheet material fixed against displacement with respect to said film-supporting surface, and pressure applying means mounted on said sheet material mounting means and adapted to bear upon one of said sheet and film materials when superposed on said film-supporting surface, said pressure applying means acting in conjunction with said film-supporting surface during relative movement of said surface and said sheet material mounting means to compress successive increment areas of said materials, including the portions between which said fluid container is positioned, for releasing and spreading said fluid throughout facing surfaces of said materials.

2. Apparatus for subjecting a photographically exposed area of a light-sensitive film material to a predetermined processing comprising, in combination, plate means comprising a surface adapted to support at least said exposed area of film, means for releasably mounting a sheet material adapted to be positioned in adjacent superposed relation with said supported area of film, said materials when in said adjacent relation being adapted to have a fluid container releasably carrying a predetermined quantity of processing fluid positioned between portions thereof, means comprising a track and portions engaging said track slidably interconnecting said plate means and said sheet material mounting means and enabling relative movement of said means, means fixed with respect to said plate means and operative during relative movement of said plate and said sheet material mounting means for holding said sheet material fixed against displacement with respect to said film-supporting surface, and a pressure applying member mounted on said sheet material mounting means and adapted to bear upon said sheet material superposed on said supported film area, said pressure applying member acting in conjunction with said film-supporting surface during relative movement of said plate and said sheet material mounting means to contact said sheet material and compress successive increment areas of said materials, including the portions between which said fluid container is positioned, for releasing and spreading said fluid throughout interface areas of said materials.

3. Apparatus for photographically exposing a light-sensitive film material and for individually subjecting exposed portions thereof to a predetermined processing comprising, in combination, means mounted adjacent the focal plane for supplying a plurality of areas of unexposed film in roll form, means for framing said film for exposure, means for photographically exposing said film, plate means comprising a frontal surface adjacent said framing means for positioning said film for exposure and a rear surface for supporting at least an exposed area of film, guide means for guiding said exposed film from said frontal surface to said rear surface, means for advancing said film to and from said plate surfaces, means for releasably mounting a sheet material comprising a plurality of surface areas adapted to be individually positioned in adjacent superposed relation with each film area supported by said rear surface, said materials when in said adjacent relation being adapted to have a fluid container releasably carrying a predetermined quantity of processing fluid positioned between portions thereof, means comprising a track and portions engaging said track slidably interconnecting said plate means and said sheet material mounting means and enabling relative movement of said means in parallel planes, means fixed with respect to said plate means and operative during relative movement of said plate and sheet material mounting means for holding said sheet material fixed against displacement with respect to said rear surface so that said portion of sheet material may be maintained in fixed superposed relationship with said supported area of film, and a pressure applying member fixed with respect to said sheet material mounting means and adapted to bear upon said sheet material superposed on said film area, said pressure applying member acting in conjunction with said plate means during relative movement of said plate and sheet material mounting means to contact said sheet material and compress successive increment areas of said materials, including the portions bearing said fluid container, so that said fluid may be released and spread throughout interface areas of said materials.

4. Apparatus for subjecting a photographically exposed area of a light-sensitive film material to a predetermined processing comprising, in combination, means comprising a surface adapted to support at least said exposed area of film, carriage means adapted to be slidably moved relative to said film-supporting surface, means for releasably mounting within said carriage in spaced relation to said film-supporting surface a sheet material adapted to be positioned for compression with said film when the latter is supported by said film-supporting surface so that a releasably contained film processing fluid, interposed between surface areas of the materials exclusive of the exposed area of film, may be released and spread between surface areas comprising said exposed area of film, means fixed with respect to said film-supporting surface and operative during movement of said carriage for fixing said sheet material against movement with said mounting means therefor so that said sheet material may be maintained in fixed superposed relationship with said film and be positioned for compression therewith, and pressure applying means mounted upon said carriage adapted to movement therewith and to bear upon said sheet material when said material is compressibly positioned with said film, said pressure applying means acting in conjunction with said film-supporting surface during slidable movement of said carriage to contact said sheet material and apply compression to successive increment areas of said materials, including the portions having said fluid interposed therebetween, so that said fluid may be released and spread in the direction of said movement throughout facing surfaces of said materials.

5. Apparatus for subjecting a photographically exposed area of a light-sensitive film material to a predetermined processing comprising, in combination, means comprising a surface adapted to support at least said exposed area of film, carriage means adapted to be slidably moved parallel to said film-supporting surface, means for releasably mounting within said carriage in spaced relation to said film-supporting surface a sheet-material adapted to be positioned for compression with said film when the latter is supported by said film-supporting surface so that a releasably contained film processing fluid, interposed between surface areas of the materials exclusive of the exposed area of film, may be released and spread between surface areas comprising said exposed area of film, means fixed with respect to said film-supporting surface and operative during movement of said carriage for maintaining said sheet material in superposed relation with said film, said means cooperating with said sheet material mounting means for placing said sheet material contiguous said film, and pressure applying means mounted upon said carriage adapted to movement therewith and to bear upon said sheet material when said material is contiguous said film, said pressure applying means acting in conjunction with said film-supporting surface during slidable movement of said carriage to contact said sheet material and apply compression to successive increment areas of said materials, including the portions having said fluid interposed therebetween, so that said fluid may be released and spread in the direction of said movements throughout interface areas of said materials.

6. Apparatus for subjecting a photographically exposed area of a light-sensitive film material to a predetermined processing comprising, in combination, plate means comprising a surface adapted to support at least said exposed area of film, carriage means adjacent said plate means, means slidably interconnecting said plate means and said carriage means enabling movement of said carriage relative to said plate means, means for mounting within said carriage a sheet material adapted to be positioned for compression with said film when the latter is supported by said surface so that a releasably contained film processing fluid, interposed between surface areas of the materials exclusive of the exposed area of film, may be released and spread between surface areas comprising said exposed area of film, means fixed with respect to said plate means and cooperating with said sheet material mounting means for positioning said sheet material for compression with said film, said means being operative during slidable movement of said carriage, and a pressure roller mounted upon said carriage adapted to movement therewith and to bear upon said sheet material after said material is compressibly positioned with said film, said pressure roller normally being spaced from said surface and being adapted during slidable movement of said carriage to contact said sheet material and apply compression to successive increment areas of said materials, including the portions having said fluid interposed therebetween, so that said fluid may be released and spread in the direction of said movement throughout interface areas of said materials.

7. Camera apparatus for photographically exposing a light-sensitive roll film material and for individually subjecting exposed portions thereof to a predetermined processing comprising, in combination, a body adapted to be rigidly held and having mounted therewithin, respectively, means for mounting a supply of said film material comprising a plurality of exposable areas, means for photographically exposing said film, plate means mounted adjacent said film supply comprising a frontal surface adapted to support said film during exposure thereof, a rear planar surface substantially parallel to said frontal surface for supporting at least an exposed area of film, and a curved surface at an extremity of said plate means for guiding said film from said frontal surface to said rear surface, take-up means mounted adjacent said film supply means for advancing said film to and from said plate surfaces and for releasably carrying an accumulation of exposed and processed film thereupon, means for actuating said take-up means, a second body in the form of a carriage slidably connected to said first-named body and comprising portions adapted to be moved in a plane parallel to the aforesaid rear planar surface, said carriage having mounted therewithin means for releasably holding a sheet material comprising a plurality of surface areas adapted to be individually positioned in superposed adjacent relation with each area of said film when the latter is supported by said rear planar surface, said sheet material carrying upon predetermined surface portions thereof a plurality of collapsible fluid containers, each container being formed for release of a film processing fluid contained therein when compressed, means mounted upon said first-named body and cooperating with said sheet material holding means for effecting release of said sheet material from said holding means to a position adjacent said supported film area, said fluid container thereby being positioned between said materials to one side of the exposed film area, said sheet material release means being rendered operative through slidable movement of said carriage, and a pressure roller mounted upon said carriage and adapted to translational movement therewith, said pressure roller being biased toward the plane of said rear planar surface and being normally positioned to one side of and contiguous an extremity of said surface adjacent which said fluid container is positioned, said roller being adapted, upon slidable movement of said carriage, to contact and move across said released sheet material for progressively subjecting said superposed sheet and film area to compression against said rear planar surface, compression first being applied to areas of said materials between which said fluid container is positioned and proceeding to successive increment areas thereof, said fluid thereby being released from said fluid container and spread throughout facing surfaces of said materials comprising said exposed area of film.

8. Camera apparatus for photographically exposing and processing a light-sensitive film material wherein a surface of said film comprising an exposed area and a surface of a sheet material bearing a collapsible fluid container releasably holding a film processing fluid are placed in superposed adjacent relation and compressed, said apparatus comprising, in combination, casing means comprising a casing section slidably engaged with a second casing section, one of said sections being adapted to be moved parallel to the other, means mounted within said first-named casing section for releasibly holding a roll film, means mounted within and associated with said first-named casing section for photographically exposing said film, plate means comprising a surface mounted within said first-named casing section, said surface being adapted to support at least said exposed area of film while compressed during processing thereof, take-up means mounted within said first-named casing section for advancing said film to and from both the focal plane and said film-supporting surface, means mounted within said second-named casing section for releasably mounting said sheet material in superposed spaced relation to said film when the latter is supported on said film-supporting surface, means mounted upon said first-named casing section and cooperating with said sheet material mounting means for maintaining said sheet material in superposed relation with said supported film during movement of a casing section and for placing said sheet material adjacent said film for compression thereof, and a pressure applying member mounted upon said second-named casing section and adapted to bear upon said sheet material when the latter is positioned for compression, said member normally being positioned adjacent said film-supporting surface out of contact with said materials and being adapted through slidable movement of said casing section to contact said materials and to apply compression to successive increment areas of said materials, including the portions having said fluid container interposed therebetween, for releasing and spreading said fluid throughout interface areas of said materials.

9. Camera apparatus for photographically exposing and processing a light-sensitive film material wherein a surface of said film comprising an exposed area and a surface of a sheet material bearing a collapsible fluid container releasably holding a film processing fluid are placed in superposed adjacent relation and compressed, said apparatus comprising, in combination, casing means comprising a casing section slidably engaged with a second casing section, one of said sections being adapted to be moved parallel to the other, means mounted within said first-named casing section for releasably holding a roll film, means mounted within and associated with said first-named casing section for photographically exposing said film, plate means comprising a surface mounted within said first-named casing section, said surface being adapted to support at least said exposed area of film during compression thereof, take-up means mounted within said first-named casing section for advancing said film to and from both the focal plane and said supporting surface, means mounted within said second-named casing section for releasably mounting said sheet material in superposed spaced relation to said film, means mounted upon said first-named casing section and cooperating with said sheet material mounting means for maintaining said sheet material in superposed relation with said supported film during movement of a casing section and for placing said sheet material adjacent said film for compression thereof, a pressure applying member mounted upon said second-named casing section and adapted to bear upon said sheet material when the latter is positioned for compression, said member normally being positioned adjacent an extremity of said surface out of contact with said materials and being adapted through slidable movement of said casing section to contact said sheet material and to apply compression to successive increment areas of said materials, including the portions having said fluid container interposed therebetween, for releasing and spreading said fluid throughout interface areas of said materials, means comprising a speed governor mounted on one of said casing sections engaging actuating means therefor mounted upon the other of said casing sections, and detent means for releasably holding said casing sections at superposed closed position.

10. Camera apparatus for photographically exposing and processing a light-sensitive film material wherein a surface of said film comprising an exposed area and a surface of a sheet material bearing a collapsible fluid container releasably holding a film processing fluid are placed in superposed adjacent relation and compressed, said apparatus comprising, in combination, casing means comprising a casing section slidably engaged with a second casing section, one of said sections being adapted to be moved parallel to the other, means mounted within said first-named casing section for releasably holding a roll film comprising a plurality of exposable areas, means mounted within and associated with said first-named casing section for photographically exposing said film, plate means comprising a surface mounted within said first-named casing section, said surface being adapted to support at least each exposed area of film during compression thereof, take-up means mounted within said first-named casing section for advancing said film to and from both the focal plane and said supporting surface, magazine means mounted within said second-named casing section for releasably mounting in superposed spaced relation to said film a plurality of sheets of said material individually adapted to be compressed with a film area comprising an exposed area thereof, means mounted upon said first-named casing section cooperating with said magazine and operative through movement of a casing section for individually releasing said sheet material from said magazine while maintaining said sheet material in superposed relation with said supported film and for placing said sheet material adjacent said film for compression thereof, and a pressure applying member mounted upon said second-named casing section and adapted to bear upon said sheet material when the latter is positioned for compression, said member normally being positioned adjacent an extremity of said surface in spaced relation to said materials and being adapted through slidable movement of said casing section to contact said sheet material and apply compression to successive increment areas of said materials, including the portions having said fluid container interposed therebetween, for releasing and spreading said fluid throughout interface areas of said materials.

11. Camera apparatus for photographically exposing and processing a light-sensitive film material wherein a surface of said film comprising an exposed area and a surface of a sheet material bearing a collapsible fluid container releasably holding a film processing fluid are placed in superposed adjacent relation and compressed, said apparatus comprising, in combination, casing means comprising a casing section slidably engaged with a second casing section, one of said sections being adapted to be moved parallel to the other, means mounted within said first-named casing section for releasably holding a roll film comprising a plurality of exposable areas, means mounted within and associated with said first-named casing section for photographically exposing said film, plate means comprising a surface mounted within said first-named casing section, said surface being adapted to support at least each exposed area of film during compression thereof, take-up means mounted within said first-named casing section for advancing said film to and from both the focal plane and said supporting surface, magazine means mounted within said second-named casing section for releasably mounting in superposed spaced relation to said film a plurality of sheets of said material individually adapted to be compressed with a film area comprising an exposed area thereof, said magazine comprising a frontal plate narrowly spaced from said surface having a slot extending longitudinally thereof, means for biasing said plurality of sheets toward said plate, means comprising an aperture formed in said magazine adjacent an extremity of said plate adapted to permit slidable movement therethrough of a sheet material biased against said plate, means mounted upon said first-named casing section comprising a friction surfaced element adapted to extend freely through said slot in said frontal plate for engaging said sheet material which is positioned thereagainst for holding said sheet material fixed with respect to said surface and for effecting slidable movement thereof with respect to said magazine so that said sheet may be positioned exteriorly of said magazine and adjacent said film for compression thereof, and a pressure applying member mounted upon said second-named casing section and adapted to bear upon said sheet material when the latter is positioned for compression, said member normally being positioned adjacent an extremity of said surface in spaced relation to said materials and being adapted through slidable movement of said casing section to contact said sheet material and to apply compression to successive increment areas of said materials, including the portions having said fluid container interposed therebetween, for releasing and spreading said fluid throughout interface areas of said materials.

12. Camera apparatus for photographically exposing and processing a light-sensitive film material wherein a surface of said film comprising an exposed area and a surface of a sheet material bearing a collapsible fluid container releasably holding a film processing fluid are placed in superposed adjacent relation and compressed, said apparatus comprising, in combination, casing means comprising a casing section slidably engaged with a second casing section, one of said sections being adapted to be moved parallel to the other, means mounted within said first-named casing section for releasably holding a roll film, means mounted within and associated with said first-named casing section for photographically exposing said film, plate means comprising a surface mounted within said first-named casing section, said surface being adapted to support at least said exposed area of film during compression thereof, take-up means mounted within said first-named casing section for advancing said film to and from both the focal plane and said supporting surface, means mounted within said second-named casing section for releasably mounting said sheet material in superposed spaced relation to said film when the latter is supported on said surface, means mounted upon said first-named casing section and cooperating with said sheet material mounting means for maintaining said sheet material in superposed relation with said supported film during movement of a casing section and for placing said sheet material adjacent said film for compression thereof, a pivotal arm mounted upon said second-named casing section, said arm mounting a pressure roller adapted to contact said sheet material when the latter is positioned for compression, and spring means applying tension to said arm for biasing said roller toward the plane of said sheet material, said pressure roller normally being positioned out of contact with said materials adjacent an extremity of said surface and being adapted through slidable movement of said casing section to contact said sheet material and apply compression to successive increment areas of said materials, including the portions having said fluid container interposed therebetween, for releasing and spreading said fluid throughout interface areas of said materials.

13. Camera apparatus for photographically exposing and processing a light-sensitive film material wherein a surface of said film comprising an exposed area and a surface of a sheet material bearing a collapsible fluid container releasably holding a film processing fluid are placed in superposed adjacent relation and compressed, said apparatus comprising, in combination, casing means comprising a casing section slidably engaged with a second casing section, one of said sections being adapted to be moved parallel to the other, means mounted within said first-named casing section for releasably holding a roll film, means mounted within and associated with said first-named casing section for photographically exposing said film, plate means comprising a planar surface mounted within said first-named casing section, said surface being adapted to support at least said exposed area of film during compression thereof, take-up means mounted within said first-named casing section for advancing said film to and from both the focal plane and said planar supporting surface, means mounted within said second-named casing section for releasably mounting said sheet material in superposed spaced relation to said film when the latter is supported on said planar surface, means mounted upon said first-named casing section and cooperating with said sheet material mounting means for maintaining said sheet material in superposed relation with said supported film during movement of a casing section and for placing said sheet material adjacent said film for compression thereof, a pivotal arm mounted upon said second-named casing section, said arm mounting a pressure roller adapted to contact said sheet material when the latter is positioned for compression, pivotal lever means mounted for independent rotation on pivotal means for said arm, said lever when rotated being adapted to contact a pin on said arm for displacing said pressure roller from said sheet material, spring means biasing said pressure roller toward the plane of said sheet material when the latter is adjacent said film and for biasing said lever toward said pin, bearing means mounted upon an extremity of said lever means, track means extending parallel to and predeterminedly spaced from said planar surface, said track means being mounted upon said first-named casing section and adapted to have said bearing means travel therewithin during movement of a casing section in a predetermined direction for maintaining said lever out of contact with said pin, said pressure roller thereby being enabled to apply compression to said materials, a second track means connecting with and parallel to said first-named track means and spaced at a lesser distance from said planar surface than said first-named track means, said bearing means being adapted to pass thereinto after traversing said first-named track means and to travel therewithin during movement of said casing section in an opposite direction, said lever thereby being caused to impinge said pin and provide displacement of said pressure roller from said sheet material, said first-named track means being operative to provide compression of successive increment areas of said materials for releasing and spreading said fluid therebetween, and said second-named track means being operative to provide spacing of the pressure roller from said materials during return of said roller to original position.

14. Camera apparatus for photographically exposing a light-sensitive film material and for individually subjecting exposed portions thereof to a predetermined processing comprising, in combination, casing means comprising a section having mounted therein a supply of roll film, a plate element comprising a frontal surface adapted to have said film positioned thereagainst for exposure and an opposite rear surface in the form of a platform adapted to have said film compressed thereagainst during processing, guide means associated with said plate for leading said film from said frontal surface to said rear platform, light-shielding means for preventing actinic light from passing from said frontal surface to said platform, take-up means mounted adjacent said film supply for advancing said film to and from said plate surfaces, means external of said casing section for actuating said take-up means, a second casing means comprising a section slidably engaging said first-named section and having releasably mounted therein a supply of sheet material carrying a plurality of fluid containers releasably containing a film processing fluid, means positioned within said second-named casing section for positioning a predetermined length of said sheet material comprising a fluid container in adjacent superposed relation to an area of exposed film when the latter is positioned on said platform and a pressure applying member mounted upon said second-named casing section and rendered operative through slidable movement of said section, said pressure applying member being adapted to compress successive increment areas of said superposed sheet material and film against said platform for releasing and spreading said fluid between interface areas of said materials comprising the exposed area of film.

15. Camera apparatus for photographically exposing a light-sensitive film material and for individually subjecting exposed portions thereof to a predetermined processing comprising, in combination, casing means comprising a section having mounted therein a supply of roll film, a plate element comprising a frontal surface adapted to have said film positioned thereagainst for exposure and an opposite rear surface in the form of a platform adapted to have said film compressed thereagainst during processing, guide means associated with said plate for leading said film from said frontal surface to said rear platform, light-shielding means adjacent extremities of said plate element for preventing actinic light from passing from said frontal surface to said platform, take-up means mounted adjacent said film supply for advancing said film to and from said plate surfaces, means external of said casing section for actuating said take-up means, a second casing means comprising a section slidably engaging said first-named section and having releasably mounted therein a supply of sheet material carrying a plurality of fluid containers releasably containing a film processing fluid, means positioned within said second-named casing section for positioning a predetermined length of said sheet material comprising a fluid container in adjacent superposed relation to an area of exposed film when the latter is positioned on said platform, and a pressure applying member mounted upon said second-named casing section and rendered operative through slidable movement of said section, said pressure applying member being adapted to compress successive increment areas of said superposed sheet material and film against said platform for releasing and spreading said fluid between interface areas of said materials comprising the exposed area of film, the aforesaid relatively slidable casing sections when at superposed closed position providing a light-tight enclosure for nonprocessed film and when slidably displaced to maximum open position providing access to the compressed materials enabling at least a portion of said sheet material to be lifted from said film.

16. Camera apparatus for photographically exposing a light-sensitive film material and for individually subjecting exposed portions thereof to a predetermined processing comprising, in combination, casing means comprising a section having mounted therein a supply of roll film, a plate element adjacent said film supply comprising a frontal surface adapted to have said film positioned thereagainst for exposure and an opposite rear surface in the form of a platform adapted to have said film compressed thereagainst during processing, guide means associated with said plate for leading said film from said frontal surface to said rear platform, light-shielding means adjacent extremities of said plate element for preventing actinic light from passing from said frontal surface to said platform, take-up means mounted adjacent said film supply for advancing said film to and from said plate surfaces, means external of said casing section for actuating said take-up means, a second casing means comprising a section slidably engaging said first-named section and having releasably mounted therein a supply of sheet material carrying a plurality of fluid containers releasably containing a film processing fluid, means positioned within said second-named casing section for positioning a predetermined length of said sheet material comprising a fluid container in adjacent superposed relation to an area of exposed film when the latter is positioned on said platform, and a pressure applying member mounted upon said second-named casing section and rendered operative through slidable movement of said section, said pressure applying member being adapted to compress successive increment areas of said superposed sheet material and film against said platform for releasing and spreading said fluid between interface areas of said materials comprising the exposed area of film, the aforesaid relatively slidable casing sections when at superposed closed position providing a light-tight enclosure for nonprocessed film and when slidably displaced to maximum open position providing access to the compressed materials enabling at least a portion of said sheet material to be lifted from said film, the aforementioned take-up means in addition to said function of taking up the exposed and processed film being adapted to take up any portions of said sheet material permitted to remain adhering thereto and any portion of said fluid in excess of that required to be retained in predetermined areas of the materials.

17. In an apparatus wherein a liquid composition is spread between a sheet of photosensitive material having a latent negative image formed therein and an image carrying layer to react with said photosensitive material to cause a positive image of said negative image to be formed on said image carrying layer, the combination comprising a backing member adapted to support said photosenitive material, a member associated with said backing member and mounted for movement relative thereto, said movement being substantially parallel to the surface of said backing member, said movable member comprising a pressure applying means, and means mounted on said movable member adapted to releasably carry a supply of said image carrying layer, said movable member being adapted upon movement thereof relative to said backing member to position said image carrying layer adjacent said photosensitive material and to cause said pressure applying means to compress successive increment areas of said photosensitive material and said image carrying layer for spreading a predetermined quantity of said liquid composition between said sheet of photosensitive material and said image carrying layer.

18. Camera apparatus for processing a photographically exposed film in conjunction with another sheet-like material by the release of a processing fluid between said film and other material, said apparatus comprising, in combination, means for mounting a supply of said photographic film, means for photoexposing a predetermined area of said photographic film, means for releasably holding a supply of said other sheet-like material for superimposition with said exposed area of said film, means for progressively applying a compression to the superimposed portions of said film and other material, said last-named means being adapted to spread said processing fluid in the form of a layer of substantially constant thickness throughout facing areas of said film and said other material, means including a portion of the casing of said camera apparatus for rendering accessible from the exterior of the apparatus the superimposed photosensitive film and other material after the processing thereof whereby at least a portion of said other material may be manually removed from the lamination formed by the spreading of said processing fluid, and means for taking up and storing the remainder of said lamination.

19. Camera apparatus for processing a photographically exposed film in conjunction both with another sheet-like material which is advanced to superposition therewith and a processing fluid releasably carried between said superposed film and other material, said apparatus comprising, in combination, means for mounting a supply of said photographic film, means for photoexposing a predetermined area of said photographic film, means for releasably holding a supply of said other sheet-like material for superposition with an exposed surface of said film, means for bringing at least an exposed surface of said film and a surface of said other material into face-to-face relationship and for progressively applying compression thereto throughout at least an area coextensive with said exposed surface, said last-named means being adapted to spread said processing fluid in the form of a layer of substantially constant thickness throughout facing areas of said film and other material which are subjected to compression thereby, movable means for actuating said compression means, said movable means in one position thereof preventing access of light to the superposed portions of said film and said sheet material and in another position thereof permitting manual access to said superposed film and other material to permit the removal of at least a portion of said second-named sheet material coextensive in area with the exposed area of said film, and means for taking up and storing the fluid treated portion of the photosensitive film after the processing thereof.

20. Camera apparatus for photographically exposing and processing a light-sensitive film material wherein a surface of said film comprising an exposed area and a surface of a sheet material bearing a collapsible fluid container releasably holding a film processing fluid are placed in superposed adjacent relation and compressed, said apparatus comprising, in combination, casing means comprising a casing section slidably engaged with a second casing section, one of said sections being adapted to be moved parallel to the other, means mounted within said first-named casing section for releasably holding a roll film, means mounted within and associated with said first-named casing section for photographically exposing said film, plate means comprising a surface mounted within said first-named casing section, said surface being adapted to support at least said exposed area of film during compression thereof, take-up means mounted within said first-named casing section for advancing said film to and from both the focal plane and said supporting surface, means mounted within said second-named casing section for releasably mounting said sheet material in superposed spaced relation to said film when the latter is supported on said supporting surface, means mounted upon said first-named casing section and cooperating with said sheet material mounting means for maintaining said sheet material in superposed relation with said supported film during movement of a casing section and for placing said sheet material adjacent said film for compression thereof, a pivotal arm mounted upon said second-named casing section, said arm mounting a pressure roller adapted to contact said sheet material when the latter is positioned for compression, spring means applying tension to said arm for biasing said roller toward the plane of said sheet material, said pressure roller normally being positioned out of contact with said materials adjacent an extremity of said supporting surface and being adapted through slidable movement of said casing section to contact said sheet material and apply compression to successive increment areas of said materials, including the portions having said fluid container interposed therebetween, for releasing and spreading said fluid throughout interface areas of said materials, means for lifting said pressure roller from said sheet material after compression of said materials, and means for maintaining said pressure roller out of contact with said materials during return of said pressure roller to original position.

OTTO E. WOLFF.

Certificate of Correction

Patent No. 2,443,154

June 8, 1948

OTTO E. WOLFF

It is hereby certified that errors appear in the printed specification of the above numbered patent requiring correction as follows:

Column 1, line 49, for the word "instructions" read *constructions*; column 5, line 69, for "gearing" read *bearing*; column 10, line 48, for "movements" read *movement*; column 12, line 11, for "releasibly" read *releasably*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*